United States Patent
Kahler et al.

(10) Patent No.: US 7,528,562 B2
(45) Date of Patent: May 5, 2009

(54) METHOD AND APPARATUS FOR CONTROLLING AN ELECTRIC MOTOR USING STAR VOLTAGE MODULATION

(75) Inventors: Paul H. Kahler, Shelby Township, MI (US); Kevin McLaughlin, Troy, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 431 days.

(21) Appl. No.: 11/433,374

(22) Filed: May 12, 2006

(65) Prior Publication Data

US 2007/0262744 A1   Nov. 15, 2007

(51) Int. Cl.
  H02P 21/00   (2006.01)
(52) U.S. Cl. .................... 318/400.02; 318/432; 318/434
(58) Field of Classification Search ............ 318/400.02, 318/400.23, 727, 432, 434
See application file for complete search history.

(56) References Cited

U.S. PATENT DOCUMENTS

| 4,780,657 A | * | 10/1988 | Brown et al. ................. 318/805 |
| 6,356,048 B1 | * | 3/2002 | Zenoni et al. ................ 318/806 |
| 6,628,485 B1 | * | 9/2003 | Rajala et al. .................. 361/31 |
| 6,737,820 B2 | * | 5/2004 | Witzig ................... 318/400.41 |

* cited by examiner

*Primary Examiner*—Rina I Duda
(74) *Attorney, Agent, or Firm*—MacMillan, Sobanski & Todd, LLC (57) ABSTRACT

A method for controlling an electric motor includes the step of determining multi-phase voltage demand values. The method also includes the steps of determining a star voltage (vstar) of the electric motor and determining multi-phase voltage output command values as a function of the star voltage (vstar) and the multi-phase voltage demand values. The method further includes the step of supplying multi-phase voltage to the electric motor in accordance with the multi-phase voltage output command values energize the electric motor.

45 Claims, 7 Drawing Sheets

METHOD AND APPARATUS FOR CONTROLLING AN ELECTRIC MOTOR USING STAR VOLTAGE MODULATION

CROSS REFERENCE TO RELATED APPLICATIONS

Not applicable.

STATEMENT REGARDING FEDERALLY SPONSORED RESEARCH

Not Applicable.

BACKGROUND OF THE INVENTION

1. Field of the Invention

The present invention relates to a method and apparatus for controlling an electric motor using star modulation.

2. Description of the Related Art

Electric motors are used to drive a variety of vehicular systems, such as electric assist steering systems, for example, which are well known in the art. In such systems, an electric assist motor, when energized, provides torque assist to aid the driver in turning steerable wheels of the vehicle. The electric assist motor is typically controlled in response to both steering torque applied to the vehicle steering wheel and measured vehicle speed. A controller monitors steering torque and vehicle speed and controls a drive circuit to control current applied to the electric assist motor. Such drive circuits can include FETs (field effect transistors) or other forms of solid state switches operatively coupled between the vehicle battery and the electric assist motor. Motor current is controlled by pulse width modulation of the FETs or switches.

An electric assist steering system can use a permanent magnet AC (PMAC) motor. The PMAC motor is a three-phase motor. The FETs would be connected to provide three-phase voltage/current to each phase (A, B, C) of the PMAC motor. The star voltage of the PMAC motor is the sum of the A, B and C phase voltages of the motor. The star voltage is measured at the wye of the motor, where the motor phases are connected to system, i.e., battery ground.

Motor control methods incorporate current control algorithms which assume that the star voltage of the motor remains constant or uncontrolled. In reality, the star voltage can vary due to a variety of factors, such as impedance variations caused by variances in the windings of the individual the motor phases. Assuming a constant star voltage in a control arrangement can lead to overmodulation. For example, if the star voltage is assumed to be zero and is actually higher, pulse-width-modulation of the FETs to supply a desired voltage to any of the motor phases would actually cause a higher voltage to be supplied to the phases. As a result, the sinusoidal voltages produced via pulse-width-modulation of the FETs would be clipped.

Overmodulation may also lead to variations in the star voltage as a function of rotor angle. As a result, the voltage available for each phase may vary depending on operating conditions. This can lead to phase-to-phase distortion, and may cause the phase-to-phase voltages and currents to become non-sinusoidal. Non-sinusoidal phase-to-phase voltages and currents may produce unwanted torque ripple and/or acoustic noise.

BRIEF SUMMARY OF THE INVENTION

In accordance with the present invention, a method and apparatus are provided for controlling current in an electric motor using star voltage modulation to maximize power, minimize line-to-line voltage distortion, and reduce torque ripple.

In accordance with one aspect of the present invention, a method is provided for controlling an electric motor. The method includes the steps of determining multi-phase voltage command values, determining a star voltage of the electric motor; and determining multi-phase voltage output command values as a function of the star voltage and the multi-phase voltage demand values. The method further includes the step of supplying multi-phase voltage to the electric motor in accordance with the multi-phase voltage output command values to energize the electric motor.

Also, in accordance with another aspect of the present invention, an apparatus is provided for controlling current in an electric motor. The apparatus includes means for providing a required torque signal indicative of output torque required from the electric motor. Motor controller means receive the required torque signal and provide a current demand signal based at least partially on the required torque signal. Current controller means determines multi-phase voltage output command values based at least partially on the current demand signal. The current controller means also determines a star voltage of the electric motor. The current controller means determines multi-phase voltage output command values as a function of the star voltage and the multi-phase voltage command values. The apparatus also includes means for supplying multi-phase voltage to the electric motor in accordance with said multi-phase voltage output command values to energize the electric motor.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DETAILED DESCRIPTION OF THE PREFERRED EMBODIMENT

Figure 1:
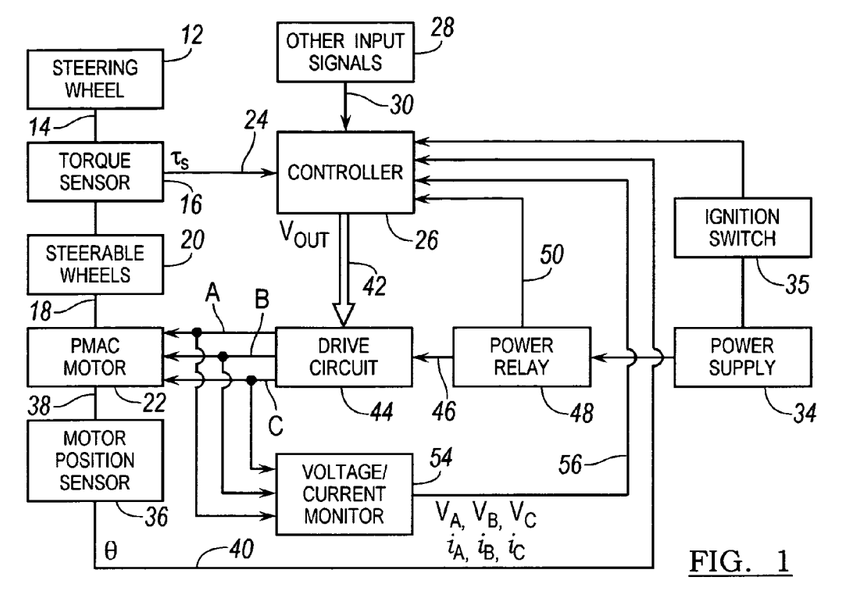
FIG. 1 is a schematic representation of an electric assist steering system in accordance with an embodiment of the present invention.

FIG. 1 illustrates a first embodiment utilizing an electric motor in a vehicle electric assist steering system 10 that includes a vehicle steering wheel 12 connected to an input shaft 14. The input shaft 14 is operatively connected to an output shaft 18 through a torsion bar (not shown). The output shaft 18 is operatively connected to steerable wheels schematically illustrated at block 20. The torsion bar twists in response to the torque applied to the vehicle steering wheel 12 and results in relative rotation between the input shaft 14 and the output shaft 18. A torque sensor 16 is operatively connected to the input shaft 14 and the output shaft 18. The torque sensor 16 senses the relative rotational movement between the input shaft 14 and the output shaft 18 and provides a signal indicative thereof which is, in turn, indicative of the applied steering torque. The torque sensor 16 includes the combination of the torsion bar and the relative rotational position sensor.

Steering assist is provided through energization of an electric motor 22. The electric assist motor 22 may be operatively connected to the steerable wheels 20 through a rack and pinion gear set. Alternatively, the motor 22 may be operatively connected with the steering column, such as to the pinion or to the output shaft 18. It is to be understood that the system 10 may be used, in accordance with the present invention, with either a rack drive, pinion drive, column drive, or any type of electric assist steering system. The system 10 also may be adapted for use with an electric powered hydraulic steering system. For the purposes of illustration and discussion, the motor 22 is schematically shown as being as being operatively connected to the steerable wheels 20. It should be understood that this connection is through one of a known rack drive, column drive, pinion drive, etc. connection.

Preferably, the electric assist motor 22 is a multi-phase motor such as a three-phase, permanent magnet, alternating current ("PMAC") motor of known configuration with its phases designated A, B, and C. The PMAC motor 22 includes a plurality of stator poles disposed in a stator housing in a generally circular array around a rotor. The rotor is also disposed within the stator housing and is rotatable about a central axis. The rotor includes a plurality of spaced apart rotor poles arranged in a generally circular array with an associated permanent magnet disposed on each rotor pole. When the stator windings are energized by appropriate AC signals, the energized stator poles create an electric field which interacts with the rotor magnetic fields and effects rotation of the rotor.

The torque sensor 16 senses the amount of steering torque applied to the steering wheel 12. The torque sensor 16 may be an inductive torque sensor, an optical torque sensor, a resistive torque sensor, or any other known type of torque sensor. The torque sensor 16 provides a sensed torque signal $\tau_s$, indicated at 24, to a controller 26 indicative of the amount of applied steering torque.

The controller 26 preferably is a microprocessor or microcomputer programmed to control the electric assist motor 22 in response to one or more input signals, including the torque sensor signal $\tau_s$. Other input signals 28, such as from a vehicle speed sensor, soft start control signals, and/or other desirable input signals, provide signal(s) 30 to the controlled.

The controller 26 receives electrical power from a power supply 34, such as the vehicle battery, through an ignition switch 35. The power supplied to the controller 26 is appropriately filtered or otherwise conditioned and maintained at a desired voltage level through a voltage regulator (not shown). Electrical power is provided to the controller 26 when the ignition switch 35 is in a RUN position.

A motor position sensor 36 is operatively connected with the electric assist motor 22 through connection 38. The motor position sensor 36 monitors the relative position between the rotor and the stator of the motor 22 and provides a motor position signal θ, indicated at 40, to the controller 26.

The controller 26 determines a voltage output command $V_{out}$, indicated at 42. The voltage output command $V_{out}$ is determined as the required level of motor voltage for energizing the electric assist motor 22 to provide an appropriate amount of steering assist responsive to controller input signals. The motor voltage command Vout 42 is supplied to a drive circuit 44 which, in turn, provides an appropriate amount of electric current to each of the plurality of phases (A, B, and C) of the motor 22. The drive circuit 44 is electrically connected through a power-relay 48 to the power supply 34. The drive circuit 44 controls the electric current in each of the A, B, and C phases of the motor 22 in response to the voltage command $V_{out}$.

Preferably, the controller 26 includes pulse-width-modulation circuitry or outputs controllably connected to an array of switching devices, preferably FETs, which comprise the drive circuit 44. Accordingly, the FETs of the drive circuit 44 are pulse-width modulated to control current in each of the phases of the electric motor 22 at a level commensurate with the applied steering torque and any other control input signals. The pulse-width-modulation of each phase during energization varies sinusoidally so that the voltage across an energized motor coil varies sinusoidally with a duty cycle resulting in a frequency beyond the audible range, such as 42.5 microseconds.

The controller 26 may also be programmed to perform suitable system diagnostics to ensure proper operation of the system 10 and, in particular, proper operation of the electric assist motor 22 and the drive circuit 44. The controller 26 may perform such diagnostics based upon the input signals to the controller 26. For example, the input signals 28 may include the output of a temperature sensor (not shown) indicating the temperature of the drive circuit 44. Other diagnostics could include analysis of the torque sensor signal, voltage levels, etc. The controller 26 may be operatively connected to the power relay 48, as indicated at 50, to open the relay upon detection of a predetermined fault condition of the system 10 and thereby disable the motor 22.

Figure 2:
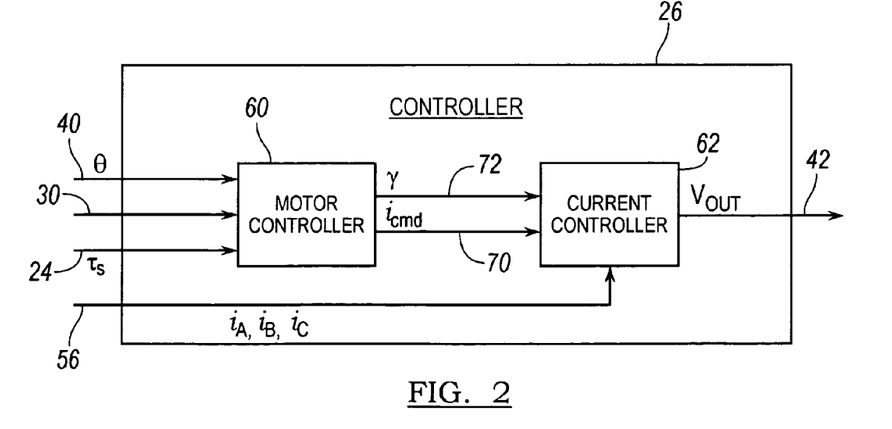
FIG. 2 is a schematic representation of a portion of the system of FIG. 1.

The system 10 also includes a monitoring device 54 for monitoring the actual voltage and/or current supplied to each phase (A, B, C) of the electric assist motor 22. The monitoring device 54 provides a signal 56 to the controller 26 indicative of the monitored voltage ($V_A, V_B, V_C$) and/or current ($i_A, i_B, i_C$) associated with each phase of the motor 22. Preferably, the signal 56 is indicative of the average current and average voltage over the sinusoidal pulse-width-modulation cycle for each phase of the motor 22. Filtering may be required to remove undesirable effects resulting from the pulse-width-modulation. Referring to FIG. 2, the controller 26 includes a motor controller 60 and a current controller 62. The motor controller 60 and the current controller 62 may comprise separate portions of a single controller, separate controllers that are operatively connected, or discrete digital and/or analog components arranged so as to perform the control processes disclosed herein.

The motor controller 60 performs an algorithm responsive to inputs 24, 30 and 40 for providing a current command $i_{cmd}$, indicated at 70, and a rotor advance angle γ, indicated at 72, to the current controller 62. The current command $i_{cmd}$ is functionally related to τ/$K_T$, where τ represents a requested motor torque expressed, for example, in lbf·ft, and $K_T$ represents torque constant of the motor 22 expressed, for example, in amps/lbf·ft. The current command $i_{cmd}$ is the amount of current, in amps, to be supplied to the motor 22. The rotor advance angle γ indicates the angle, with respect to the stator, to which the rotor is to be commanded. The rotor advance angle γ is determined based on the requested motor torque τ and the sensed rotor position θ.

The motor controller 60 determines a value of motor torque τ required to provide steering assist. The required motor torque τ, in accordance with the present invention, is based, at least partially, on the sensed applied steering torque signal $\tau_s$, indicated at 24, the sensed rotor position relative to the stator or angle θ, indicated at 40, and the motor rotor speed $\bar{\omega}_r$, determined from the change in rotor position θ as a function of time. The required motor torque τ may be determined using equations or by selecting values from a look-up table. It will be appreciated that a look-up table would contain discrete values of required motor torque τ as a function of sensed input signals. Interpolation of the look-up table data may be used to more accurately determine the requested motor torque τ.

The rotor advance angle γ is, preferably, selected from a look-up table based, at least partially, on the determined rotational speed $\bar{\omega}_r$ of the rotor. Interpolation may be used to more accurately determine the rotor advance angle γ based on discrete values stored in the look-up table. It will be appreciated, however, that the rotor advance angle γ could alternatively be determined using equations. Also, while the rotor advance angle γ is illustrated as being calculated by the motor controller portion 60 of the controller 26, the rotor advance angle γ could be calculated by the current controller portion 62 of the controller 26.

The current controller 62 performs an algorithm for providing the voltage output command $V_{out}$ indicated at 42, to the drive circuit 44 (FIG. 1). The current controller 62 commands FETs in the drive circuit 44. Precise knowledge of the voltage of the power supply 34, i.e. battery voltage, is not necessary to control voltage across the motor windings, i.e. phases A, B, and C. The algorithms used by the motor controller 60 and the current controller 62 utilize normalized voltage commands where 1 is full battery voltage and 0 volts relative to battery ground. Full battery voltage is achieved by commanding FET5 fully ON. Zero battery voltage by commanding FET5 fully OFF. Typically, the star (or wye) connection point of the motor (the common connection of the motor phases) is kept at 0.5 battery voltage so that the maximum voltage across a motor phase coil relative to the star connection point is either +0.5*(battery voltage) or −0.5* (battery voltage).

Known current control methods for star configured motors assume that the star voltage of the motor remains constant. In practice, however, overmodulation, i.e., clipping of the sine waves produced through pulse-width-modulation leads to variations in the star voltage. As a result, the maximum voltage available for each motor phase may not be ±0.5 battery voltage under all operating conditions. This can lead to phase-to-phase distortion, and may cause the phase-to-phase voltages to become non-sinusoidal. These non-sinusoidal phase-to-phase voltages may produce unwanted torque ripple and/or acoustic noise.

According to the present invention, the star voltage is modulated in such a way so as to permit an increase in the line-to-line voltage while maintaining a sinusoidal drive. The star voltage modulation of the present invention does not result in a power reduction and minimizes AC current disturbances at high motor rpm. This helps to reduce motor torque ripple and acoustic noise.

In performing calculations to determine the voltage to be applied to the three phases of the motor, it is desirable to perform the calculations in a dq reference frame, i.e., using dq vector analysis, to help simplify calculations. The dq vector analysis incorporates a two-dimensional vector representation of motor voltage which corresponds to three-phase (A,B, C) motor voltage values. Motor voltages can be converted back and forth between the dq reference frame and the ABC motor phase frame using known mathematical transformation methods. ABC frame voltages can be converted to the dq frame using a T matrix transformation. The dq frame voltages can be converted back to the ABC frame using a T' matrix transformation.

Given a rotor (electrical) angle θ and a rotor advance angle γ, one can determine the largest dq voltage magnitude that can be obtained. As an example, assume the rotor angle θ is zero and the maximum dq voltage magnitude is computed for all advance angles.

At zero degrees, the T-matrix is:

$$T = \begin{bmatrix} 0 & 0.86603 & -0.86603 \\ 1 & -0.5 & -0.5 \end{bmatrix}, \quad (1)$$

Figure 3:
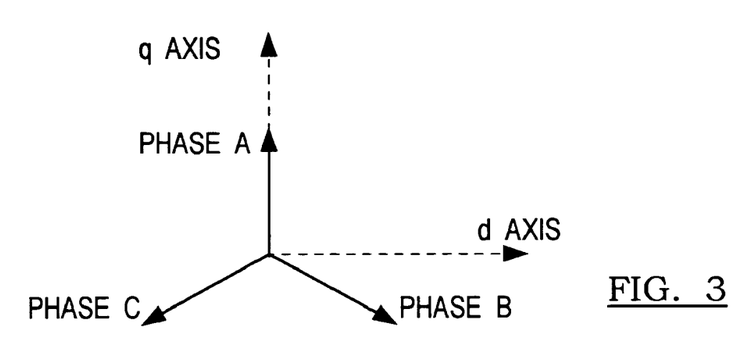
FIG. 3 is a diagram illustrating the relationship between a dq axis and three-phase voltages of an electric motor of the system of FIG. 1.

As shown in equation (1), the phase-A voltage-points in the dq direction [0, 1], the phase-B voltage points in the dq direction [0.86603, −0.5], and the phase-C voltage points in the dq direction [−0.86603, −0.5]. A diagram of the relationship between the dq-axis and the ABC vectors is shown in FIG. 3 for zero electrical degrees. Note that in equation (1), the first row of the T-matrix are sine functions and the second row are cosine functions. Given the electrical angle θ, an algorithm for determining the maximum dq vector available at any advance angle is as follows:

1.) Chose an advance angle γ and create a vector in the dq frame of length 2:

$$V_{dq} = 2 \begin{bmatrix} \cos(\gamma) \\ \sin(\gamma) \end{bmatrix}, \quad (2)$$

2.) Determine the dot product of the vector $v_{dq}$ with each of the three columns of the T-matrix, i.e., compute the vector $T'v_{dq}$.

3.) Set the command for the two vectors that creates the maximum absolute value of the dot product equal to 0.5 times the sign of the dot product. For example, if the dq vector is equal to [1, 0] and pointed along the x-axis direction, then the dot product is [0, 0.86603, −0.86603]

4.) Command the remaining vector to a magnitude such that the vector obtained by multiplying the final command times the T-matrix is in the same direction as the original dq vector. In the present example, the $1^{st}$ vector cannot point along the x-axis, so it is zero. In general, the third vector must be commanded to a non-zero magnitude to preserve the direction of the dq-vector. Let a be the direction of the original dq vector:

$$\alpha = a\tan 2(v_q, v_d) \quad (3)$$

Let $v_1$ and $v_2$ be the directions of the two ABC vectors that create the maximum dot product and $v_3$ be the direction of the third. Let $m_1$ be the magnitude of $v_1$, $m_2$ be the magnitude of $v_2$ and $m_3$ the magnitude of $v_3$. The final dq vector is:

$$v_{dq} = m_1 v_1 + m_2 v_2 + m_3 v_3 \qquad (4)$$

and must point in direction of a. If a second index of either d or q is added to the "v" vectors to rotate the d-axis and q-axis components, the angle of the final vector is:

$$\alpha = a\tan 2((m_1 v_{1q} + m_2 v_{2q} + m_3 v_{3q}), (m_1 v_{1d} + m_2 v_{2d} + m_3 v_{3d})) \qquad (5)$$

which can be solved for $m_3$.

Exemplary of the above-listed algorithm, let $\theta = 0.5$ radians. The T-matrix is:

$$T = \begin{bmatrix} 0.47943 & 0.52030 & -0.999720 \\ 0.87758 & -0.85399 & -0.023597 \end{bmatrix}, \qquad (6a)$$

Let $\gamma = 0.29671$ radians. The dq voltage vector is:

$$v_{dq} = 2\begin{bmatrix} \cos(\gamma) \\ \sin(\gamma) \end{bmatrix} = \begin{bmatrix} 1.9126 \\ 0.58474 \end{bmatrix} \qquad (6b)$$

The quantity (T'V$_{dq}$) from step 2 is [1.4301, 0.49576, -1.9259]. From step 3, set the command for Phase-A to +0.5 and the command for Phase-C to -0.5. Solving equation (5) for the magnitude of Phase-B yields 0.22195. The maximum dq vector for the desired directions is:

$$v_{dq} = (2/3) * \begin{bmatrix} 0.47943 & 0.52030 & -0.999720 \\ 0.87758 & -0.85399 & -0.023597 \end{bmatrix} \begin{bmatrix} 0.5 \\ 0.22195 \\ -0.5 \end{bmatrix} = \begin{bmatrix} 0.56991 \\ 0.17424 \end{bmatrix} \qquad 6(c)$$

Figure 4:
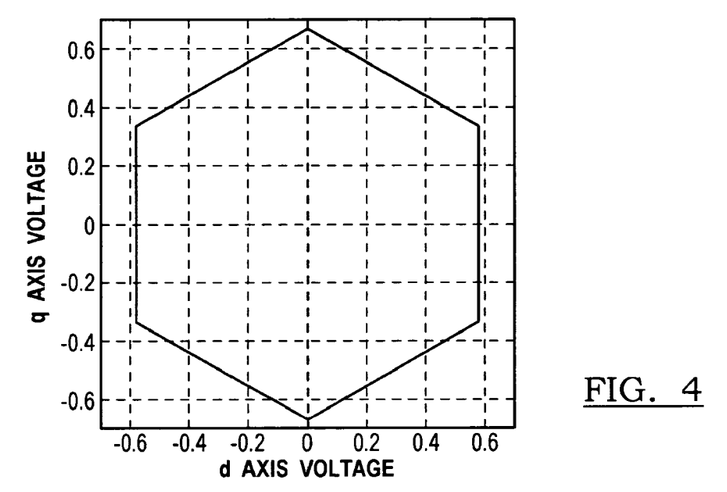
FIG. 4 is a graph illustrating the maximum dq voltage at zero electrical degrees for the electric motor of the system of FIG. 1.
Figure 5:
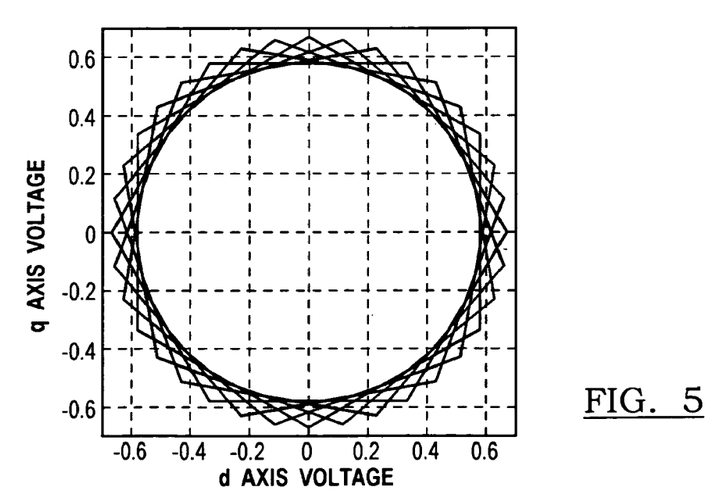
FIG. 5 is a graph illustrating the maximum dq voltage at increments of ten electrical degrees for the electric motor of the system of FIG. 1.

Using the above algorithm, the maximum dq voltage for all advance angles $\gamma$ at a fixed rotor angle $\theta$ can be determined. It will be appreciated that, in practice, the dq-voltage is constant and the rotor angle $\theta$ rotates. The fixed rotor angle $\theta$ approach, however, is sufficient for illustrative purposes. FIG. 4 illustrates the maximum dq voltage for all advance angles $\gamma$ at a fixed rotor angle $\theta$ of zero degrees. In FIG. 5, the hexagons are rotated to illustrate the maximum dq voltage for all advance angles $\gamma$ at a rotor angle $\theta$ increments of 10 electrical degrees. Note that the interior of the hexagons in FIG. 5 form a circle. The dq voltages represented by this circle are available regardless of the orientation of the hexagon, i.e., regardless of the rotor angle $\theta$.

Figure 6A:
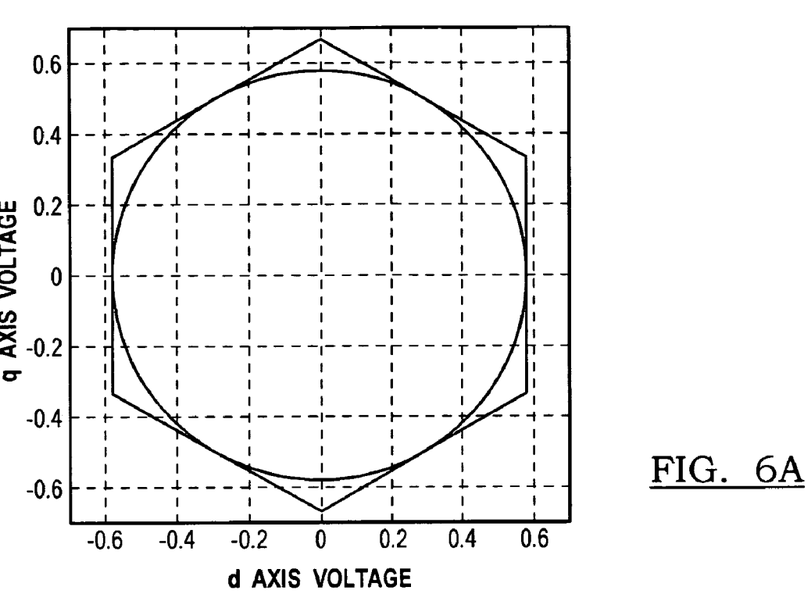
FIG. 6a is a graph illustrating a limited dq voltage at zero electrical degrees for the electric motor of the system of FIG. 1.

The maximum radius circle that can fit inside the hexagon has radius 1/(sqrt 3). The circle with this radius and the hexagon is shown in FIG. 6a for zero electrical degrees. The circle is tangent to six points of the hexagon and thus has the largest radius that will fit inside the hexagon. The dq voltages represented by the circle are thus less than or equal to the maximum dq voltage at every advance angle $\gamma$. If the radius of the circle was such that a portion of the circle extends outside the hexagon, the dq voltage at that portion would be limited by the hexagon rather than the circle. In this instance, the dq voltage would be distorted such that the magnitude of the dq voltage would not be constant at each advance angle $\gamma$. It will thus be appreciated that the circle represents the greatest dq voltage available, without distortion, for each advance angle of each rotor position $\theta$.

Figure 6B:
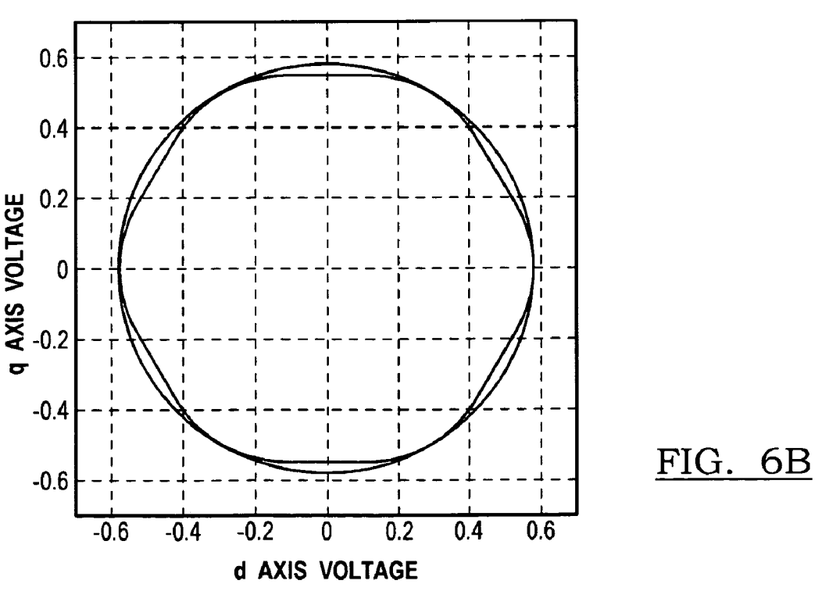
FIG. 6b is a graph illustrating an overmodulated dq voltage at zero electrical degrees for an electric motor of a motor control system that assumes a constant star voltage of the electric motor.

In contrast, FIG. 6b illustrates the circle (dashed line) of FIG. 6a along with an overmodulated voltage (solid line) at zero electrical degrees. The overmodulated voltage applies an overmodulation factor of 1.3. It will be appreciated that the dq voltage realized through overmodulation is not constant at each advance angle $\gamma$ and is distorted.

According to the present invention, the star voltage is used to increase the maximum dq voltage without distortion. Since the null space of the T-matrix is [1 1 1], any voltage can be added to all three ABC commands without effecting the dq voltage. Therefore, if it is desired to increase one of the ABC voltages beyond its limit of 0.5, the star voltage can be adjusted, i.e. lowered, to affect a larger voltage from the particular one of the ABC voltages. This is predicated on the fact that the other two voltages must not be at their limit or else the method will not work. However, if the magnitude of the dq voltages is limited to the circle of FIG. 5, i.e., limited to 1/(sqrt 3), then only one of lines A, B and C will ever be at a limit and the star voltage can be modulated in such a way as to keep all three ABC voltages sinusoidal with respect to the star without distortion.

In accordance with the present invention, an algorithm for star voltage modulation is as follows:

1.) Compute demanded q-axis and d-axis voltages, $v_q$ and $v_d$ respectively, using a PI control law.

2.) Compute the vector magnitude of the demanded $v_q$ and $v_d$ voltages.

3.) Limit the vector magnitudes of $v_d$ and $v_q$ so that their vector direction is unchanged but their magnitude is less than 1/(sqrt 3).

4.) Convert the limited $v_d$ and $v_q$ to the ABC frame using the T' matrix.

5.) Compute the star voltage according to the following formula:

$$V_{star} = -k * V_a * V_b * V_c,$$

where Va, Vb, Vc are phase voltages, and k is a modulation constant. Preferably, the modulation constant is limited to 2 and a respective phase voltage is maintained between +0.5 and -0.5.

6.) Add the star voltage to each of the three ABC phases.

7.) Bias the voltages to 0.5 battery voltage, (i.e. add 0.5 to each of the ABC phase voltage commands).

8.) Limit the voltages commands between 0 and 1.

In the above algorithm, a more general formula for determining the modulation constant is represented by the formula:

$$k = 0.5/X^2$$

where a goal would be to limit the phase voltages to +/-X while allowing maximum phase to phase voltage (i.e., limiting the phase voltages to +1.0 and -1.0 would result in a modulation constant of 0.5).

Alternatively, in step 5, the star voltage could be computed as the follows:

if (abs($v_a$) > (½)), then
 $V_{star} = (\text{sign}(v_a) * (½)) - v_a$;
if (abs($v_b$) > (½)), then
 $V_{star} = (\text{sign}(v_b) * (½)) - v_b$;
if (abs($v_c$) > (½)), then
 $V_{star} = (\text{sign}(v_c) * (½)) - v_c$;

where sign ( ) indicates the mathematical sign, (i.e., plus (+) or minus (−) of the quantity in the parenthetical. As stated above, only one of the A, B, and C voltages at a time will ever exceed the 0.5 limit. Therefore, the left side of the only one of the above equation will ever be true and, thus, only one value for the star voltage will be determined.

Figure 7:
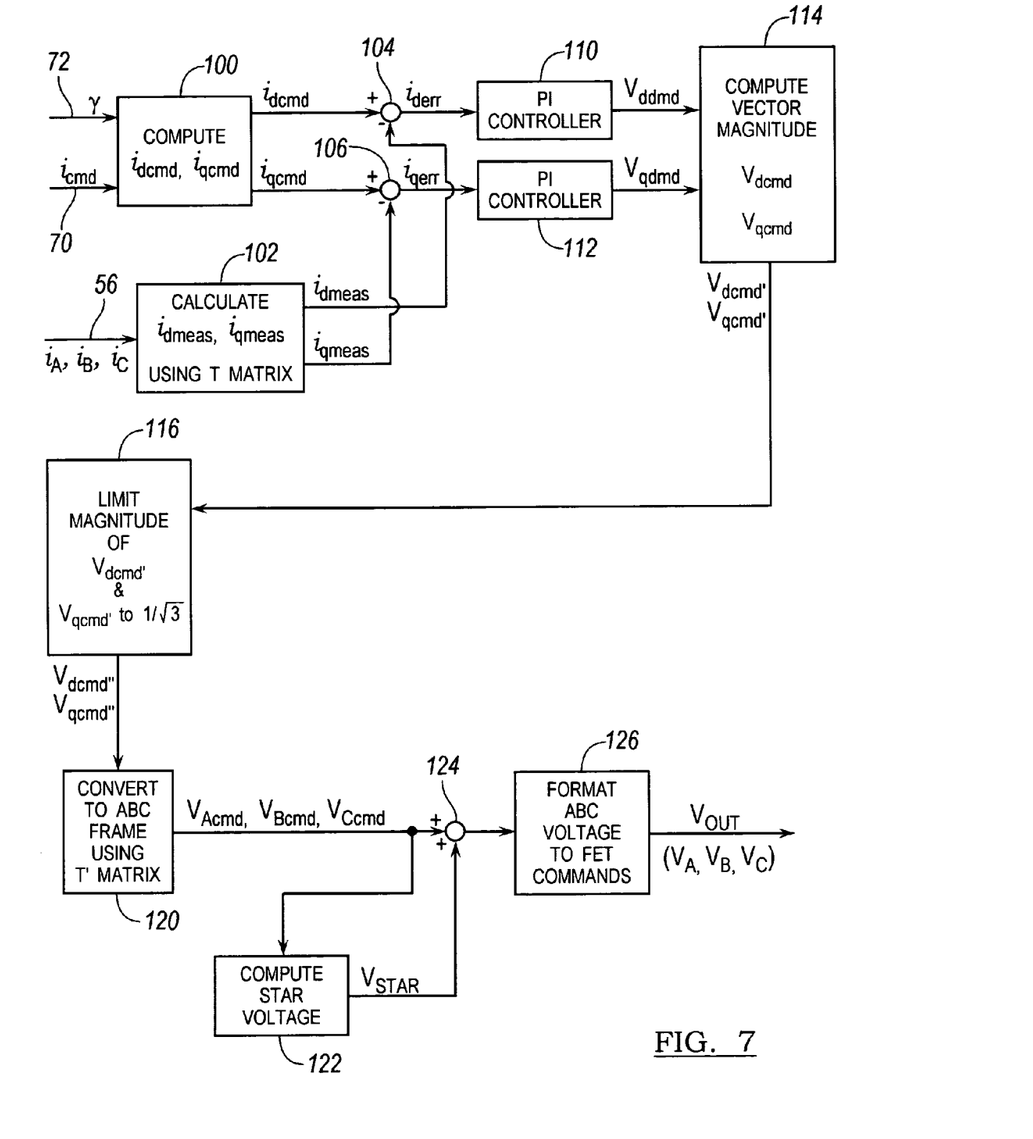
FIG. 7 is a functional block diagram illustrating the operation of a current controller portion of the controller of FIG. 2.

In accordance with the preferred embodiment, the current controller 62 (FIG. 2) controls the current provided to the A, B, and C phases of the motor 22 (FIG. 1) in accordance with the control loop illustrated in FIG. 7. The control loop of the functional block diagram of FIG. 7 controls the motor current in accordance with the star voltage modulation algorithm set forth above.

At function 100, d-axis and q-axis current commands are calculated based on the advance angle γ, identified at 72, and the current command $i_{cmd}$, indicated at 70, provided by the motor controller 60 (FIG. 2). The calculated dq current commands, $i_{qcmd}$ and $i_{dcmd}$, (FIG. 6) are determined according to the following equations:

$$i_{qcmd} = i_{cmd}(\cos(\gamma)) \quad (8a)$$

$$i_{dcmd} = i_{cmd}(\sin(\gamma)) \quad (8b)$$

At function 102, d-axis and q-axis currents are computed based on the measured three-phase currents $(i_A, i_B, i_C)$ provided by the measured three-phase current signal indicated at 56 using the T-matrix:

$$T = \begin{bmatrix} \sin\theta & \sin(\theta - 120°) & \sin(\theta + 120°) \\ \cos\theta & \cos(\theta - 120°) & \cos(\theta + 120°) \end{bmatrix}$$

At function 104, the measured d-axis current $i_{dmeas}$ subtracted from the calculated d-axis current command $i_{dcmd}$ to determine a d-axis current error signal $i_{derr}$. At function 106, the measured q-axis current $i_{qmeas}$ is subtracted from the calculated q-axis current command $i_{qcmd}$ to determine a q-axis current error signal $i_{qerr}$.

At function 110, a d-axis voltage demand $v_{ddmd}$ is generated, based on the d-axis current error $i_{derr}$, using a proportional and integral (PI) control algorithm. At function 112, a q-axis voltage demand $v_{qdmd}$ is generated, based on the q-axis current error $i_{qerr}$, using a PI control algorithm.

At function 114, the vector magnitude of the dq voltage demands $v_{ddmd}$ and $v_{qdmd}$ are computed. Function 114 produces dq voltage commands $v_{dcmd'}$ and $v_{qcmd'}$. At function 116, the dq voltage commands $v_{dcmd'}$ and $v_{qcmd'}$ are limited so that their vector direction is unchanged but their magnitude is less than 1/(sqrt3). Function 116 produces limited dq voltage commands $v_{dcmd''}$ and $v_{qcmd''}$. At function 120, the limited dq voltage commands $v_{dcmd''}$ and $v_{qcmd''}$ are converted to the three-phase ABC frame using the T' matrix:

$$T' = \begin{bmatrix} \sin\theta & \cos\theta \\ \sin(\theta - 120°) & \cos(\theta - 120°) \\ \sin(\theta + 120°) & \cos(\theta + 120°) \end{bmatrix}$$

Function 120 produces three-phase voltage demands $v_{Acmd}$, $v_{Bcmd}$, and $v_{Ccmd}$. At function 122, the star voltage is determined according to the following formula:

$$V_{star} = -k * V_{Acmd} * V_{Bcmd} * V_{Ccmd},$$

where $V_{Acmd}$, $V_{Bcmd}$, $V_{Ccmd}$ are command phase voltages, and k is a modulation constant.

A preferred modulation constant of k=2 maintains a resulting ABC voltage commands $V_{Acmd'}$, $V_{Bcmd'}$, and $V_{Ccmd'}$ between −0.5 and +0.5.

In the alternative embodiment, star voltage is computed as the difference between the ABC commands and 0.5, according to the following formula:

if (abs($v_a$)>(½)), then
$V_{star} = (\text{sign}(v_a) * (½)) - v_a$;
if (abs($v_b$)>(½)), then
$V_{star} = (\text{sign}(v_b) * (½)) - v_b$;
if (abs($v_c$)>(½)), then
$V_{star} = (\text{sign}(v_c) * (½)) - v_c$;

where only one of the A,B,C voltages at a time will ever exceed the 0.5 limit and, therefore, only one value for the star voltage will be determined.

At function 124, the determined star voltage $V_{star}$ is added to each of the three-phase voltage commands $V_{Acmd}$, $V_{Bcmd}$, and $V_{Ccmd}$.

At function 126, the resulting ABC voltage commands $V_{Acmd'}$, $V_{Bcmd'}$, and $V_{Ccmd'}$ are formatted to the voltage output command $v_{out}$ illustrated at 42 (FIGS. 1, 2 and 7), and sent to the drive circuit 44 (FIG. 1). At function 126 (FIG. 7), the voltage output command $v_{out}$, is formatted to provide the appropriate FET pulse-width-modulation commands for each of the resulting ABC voltage commands $V_{Acmd'}$, $V_{Bcmd'}$, and $V_{Ccmd'}$. The ABC voltage demands $v_{Acmd}$, $v_{Bcmd}$, and $v_{Ccmd}$ are also biased to 0.5 battery voltage, i.e., 0.5 is added to each of $V_{acmd'}$, $V_{Bcmd'}$, and $V_{Ccmd'}$. The resulting ABC voltage commands $V_{acmd'}$, $V_{Bcmd'}$, and $V_{Ccmd'}$ are then limited to $\geq 0$ and $\leq 1$.

It may be desirable to limit the resulting ABC voltage demands $V_{acmd'}$, $V_{Bcmd'}$, and $V_{Ccmd'}$ to between 003 and 0.97 to avoid shoot-through currents under all conditions. In the present invention, however, this is not necessary because such voltage limitation is inherent in the algorithm performed by the current controller 62. The voltage limit can thus be increased, raising the maximum voltage achievable across the coil(s) and reducing switching losses.

Exemplary of the performance of the star voltage modulation technique of the present invention as opposed to known overmodulation techniques, consider the following example: Suppose the dq voltage of vq=1.3*0.5 and vd=0 is desired. This is equivalent to the known current control method using an overmodulation factor of 1.3. Note that because the ABC voltages rotate about the dq voltages, it does not matter what direction is chosen for the dq voltages to illustrate the effect of the limiting. Over one rotation, vectors of similar length will be limited similarly, just at different electrical angles.

Figure 8A:
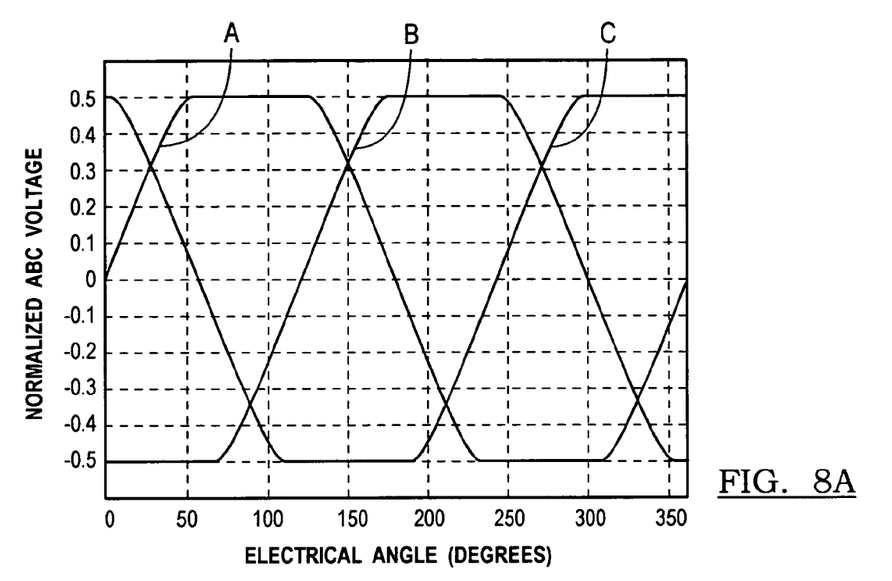
FIGS. 8a and 8b are graphs illustrating realized three-phase and dq voltages, respectively, for an electric motor of a motor control system that assumes a constant star voltage of the electric motor.
Figure 8B:
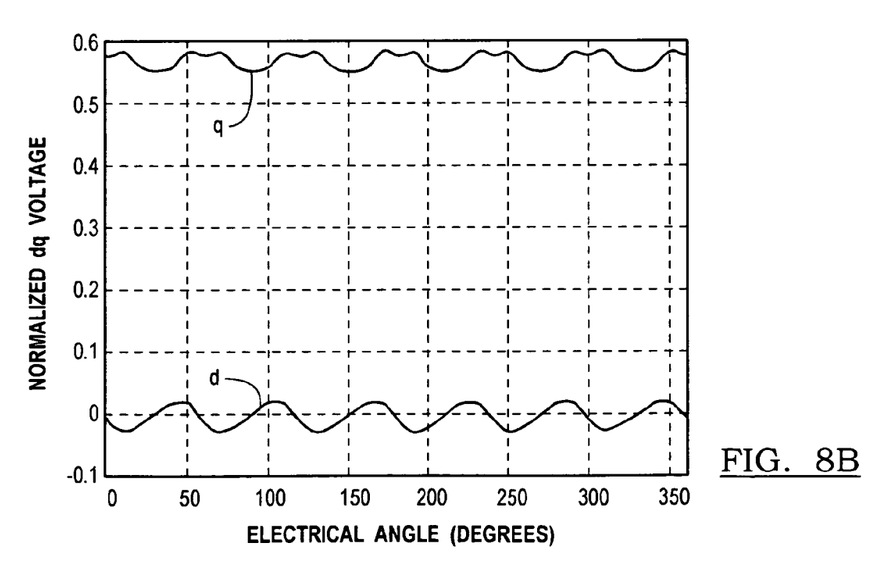

FIGS. 8a and 8b and FIGS. 9a and 9b illustrate the results realized by applying the known overmodulation techniques, with an overmodulation factor of 1.3, to control the ABC voltage commands $v_{Acmd}$, $v_{Bcmd}$, and $v_{Ccmd}$. FIG. 8a shows the effective ABC voltages (indicated at A, B, and C) and FIG. 8b the resulting realized dq voltages (indicated at d and q). As shown in FIG. 8b, both the d-axis and q-axis voltages have AC components of ripple induced by the limiting performed in the ABC frame. This is evidenced by the non-linear appearance of the dq voltages in FIG. 8b.

Figure 9A:
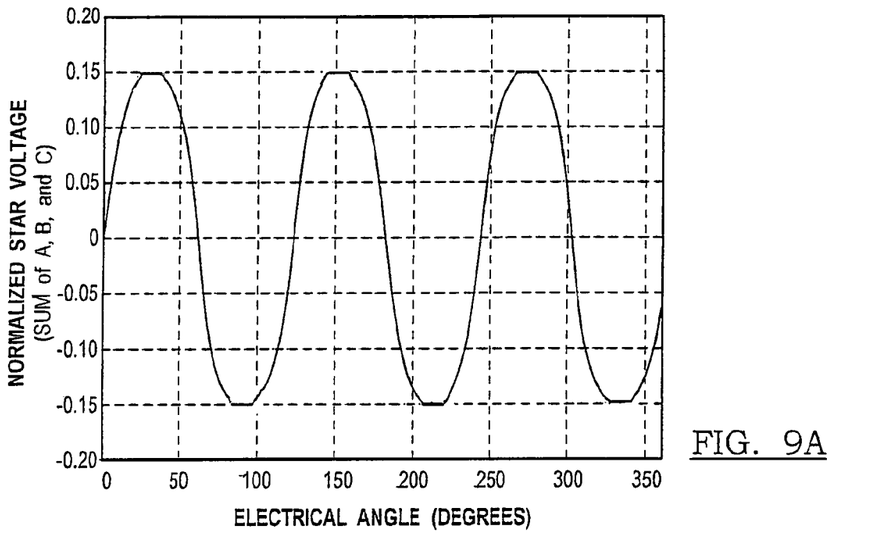
FIGS. 9a and 9b are graphs illustrating realized star voltage and AB line-to-line voltage, respectively, for an electric motor of a motor control system that assumes a constant star voltage of the electric motor.
Figure 9B:
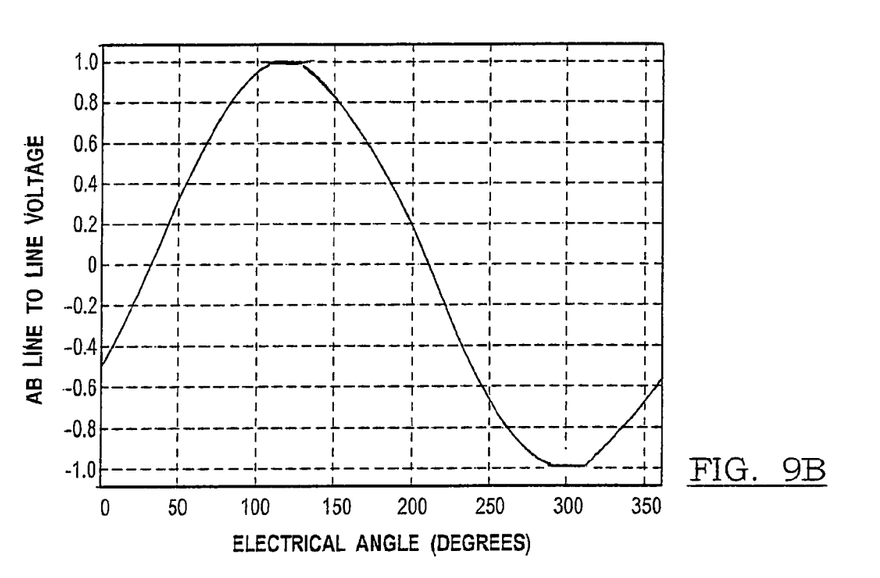

FIG. 9a illustrates the star voltage, computed by applying the known overmodulation techniques, as the mean of the sum of the three voltages at each electrical angle. FIG. 9b illustrates the AB line-to-line voltage computed as the difference between the A and B voltages. As shown in FIG. 9a, the star voltage is not sinusoidal and the AB line-to-line voltage is flat at both the minimum and maximum values, which indicates distortion of the voltage.

Figure 10A:
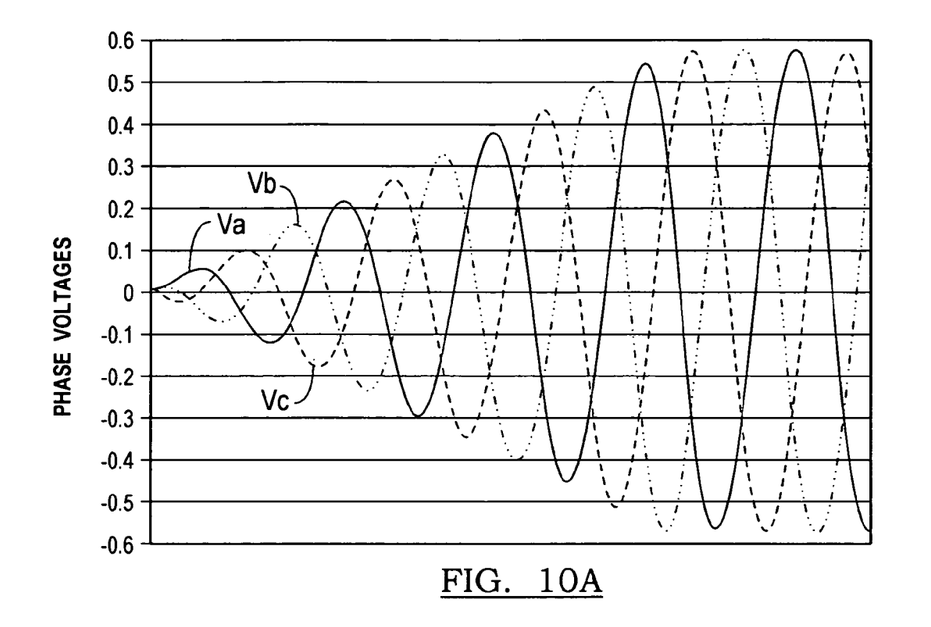
FIGS. 10a and 10b are three-phase voltage graphs illustrating before offset and phase voltage with star voltage offset, respectively, for the electric motor of the system of FIG. 1
Figure 10B:
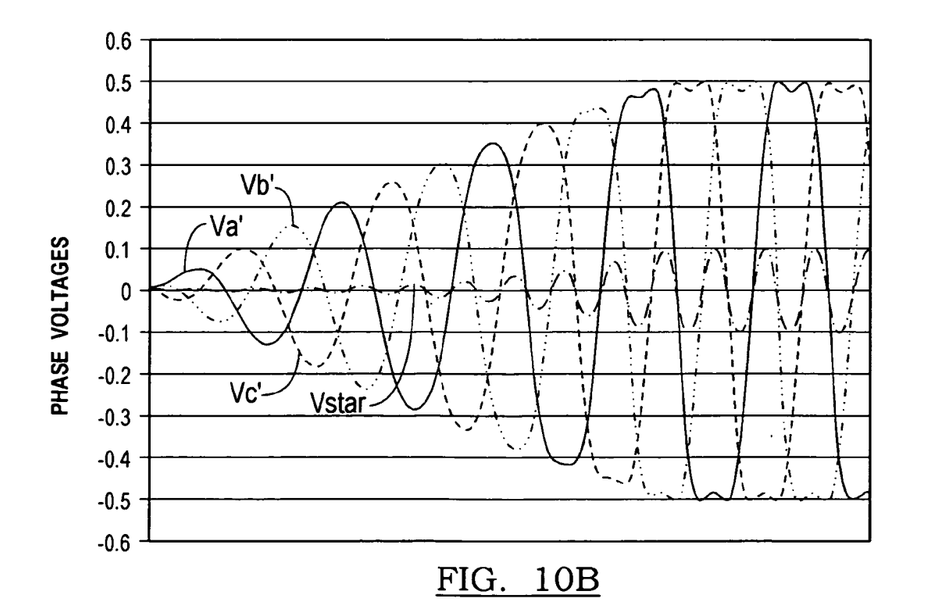

FIGS. 10a and 10b illustrate the advantages modulating the phase voltages using the star voltage offset according to the preferred embodiment of the present invention. FIG. 10a illustrates a graph of the phase voltages of a motor before utilizing a star voltage offset. FIG. 10b illustrates a graph of the star modulation technique illustrating the phase voltages and star voltage using the star voltage offset $V_{star}=-k*V_{Acmd}*V_{Bcmd}*V_{Ccmd}$ (e.g., k=2). When the phase voltages $V_a, V_b, V_c$ are small, the star voltage is negligible and has little affect on the phase voltages. As the phase voltage increases, the star voltage increases as a cube of the phase voltages. As a result, a pure sinusoidal star voltage sine waveform is generated which is three times a frequency of a respective phase voltage. The range of the larger phase voltages are limited while preserving the sinusoidal phase-to-phase voltages of the higher amplitudes. The star voltage realized by the star voltage modulation method of the present invention has harmonics. It is also noted that this modulation technique can be used in systems that produce the three-phase voltages in other ways so long as the relationship between the voltages is preserved. For example, the voltages can be illustrated as three points of a sine wave having equal amplitude and spaced 120 degrees.

From the above description of the invention, those skilled in the art will perceive improvements, changes and modifications. Such improvements, changes and modifications within the skill of the art are intended to be covered by the appended claims.

What is claimed is:

1. A method for controlling an electric motor, said method comprising the steps of:
    determining multi-phase voltage command values;
    determining a star voltage of the electric motor;
    determining multi-phase voltage output command values as a function of said star voltage and said multi-phase voltage command values; and
    supplying multi-phase voltage to said electric motor in accordance with said multi-phase voltage output command values to energize the electric motor.

2. The method recited in claim 1, wherein said step of supplying multi-phase voltage to said electric motor comprises supplying sinusoidal line-to-line voltages to said electric motor.

3. The method recited in claim 1, wherein said multi-phase voltage output command values are determined as the sum of said star voltage and said multi-phase voltage command values.

4. The method recited in claim 1, wherein said step of determining multi-phase voltage demand values comprises the steps of:
    determining motor dq voltage demand values, said dq voltage demand values comprising a d-axis voltage demand value and a q-axis voltage demand value;
    limiting said dq voltage demand values to limited dq voltage demand values, said limited dq voltage demand values being limited to the highest dq voltage available at every advance angle for every electrical angle of the electric motor; and
    converting the limited dq voltage demand values to said multi-phase voltage command values.

5. The method recited in claim 4, wherein said step of converting said limited dq voltage demand values comprises the step of using a T'-matrix to convert said limited dq voltage demand values to said multi-phase voltage command values.

6. The method recited in claim 4, wherein the step of determining motor dq voltage demand values comprises the step of using a proportional and integral control law to determine said dq voltage demand values.

7. The method recited in claim 6, wherein the step of using a proportional an integral control law comprises the steps of:
    applying said proportional and integral control law to a d-axis current error value to determine said d-axis voltage demand value, said d-axis current error value being determined as the difference between a calculated d-axis current command and a measured d-axis current; and
    applying said proportional and integral control law to a q-axis current error value to determine said q-axis voltage demand value, said q-axis current error value being determined as the difference between a calculated q-axis current command and a measured q-axis current.

8. The method recited in claim 7, wherein said calculated d-axis current command and said calculated q-axis current command are determined as a function of a motor current command value and a motor advance angle value, said motor current command value being determined at least partially as a function of a sensed torque value, said motor advance angle being determined at least partially as a function of a determined rotational speed of the electric motor.

9. The method recited in claim 4, wherein the step of limiting said dq voltage demand values comprises the steps of computing a vector magnitude of each of said dq voltage demand values and limiting said vector magnitudes to said limited dq voltage demand values.

10. The method recited in claim 4, wherein said limited dq voltage demand values are limited to full system voltage multiplied by $1/(\sqrt{3})$.

11. The method recited in claim 4, wherein said star voltage of the electric motor is determined as the difference between one of said multi-phase voltage command values and one-half of a full system voltage, said one of said multi-phase voltage command values having an absolute value greater than one-half of the full system voltage.

12. The method recited in claim 4, wherein said star voltage of electric motor is determined by the following formula:

$$V_{star}=-k*V_a*V_b*V_c,$$

where $V_a$, $V_b$, $V_c$ are phase voltages, and k is a modulation constant.

13. The method recited in claim 12, wherein said modulation constant is equal to 2 and said predetermined phase voltage output is between +0.5 and −0.5.

14. The method recited in claim 12, wherein said modulation constant is equal to 0.5 and said predetermined phase voltage output is between +1 and −1.

15. The method recited in claim 12, wherein said phase voltages are limited to a predetermined voltage (X) and said modulation constant is determined by the following formula:

$$k=0.5/X^2.$$

16. The method recited in claim 4, further comprising the step of biasing said multi-phase phase voltage output command values to one-half of a full system voltage.

17. The method recited in claim 4, further comprising the step of limiting said multi-phase voltage output command values to between zero voltage and full system voltage.

18. The method recited in claim 4, wherein said electric motor comprises an electric assist motor of an electric assist steering system, said step of determining motor dq voltage demand values comprising the step of determining motor dq voltage demand values in response to an applied steering torque.

19. The method recited in claim 1, wherein said electric motor comprises a permanent magnet three-phase electric motor, said step of determining multi-phase voltage command values comprising the step of determining three-phase voltage command values, said step of determining multi-phase voltage output command values comprising the step of determining three-phase voltage output command values, and said step of supplying multi-phase voltage to said electric motor comprising the step of supplying three-phase voltage to said electric motor.

20. A method for controlling an electric assist motor of an electric assist steering system, said method comprising the steps of:
   determining motor dq voltage demand values in response to applied steering torque;
   limiting said dq voltage demand values to limited dq voltage demand values;
   converting the limited dq voltage demand values to multi-phase voltage command values;
   determining a star voltage of the electric motor;
   determining multi-phase voltage output command values as a function of said star voltage and said multi-phase voltage command values; and supplying multi-phase voltage to said electric assist motor in accordance with said multi-phase voltage output command values to energize the electric assist motor.

21. The method recited in claim 20, wherein said limited dq voltage demand values are limited to the highest dq voltage available at every advance angle for every electrical angle of the electric motor.

22. The method recited in claim 20, wherein said step of supplying multi-phase voltage comprises the step of supplying sinusoidal line-to-line voltage.

23. An apparatus for controlling an electric motor comprising, said apparatus comprising:
   means for providing a required torque signal indicative of output torque required from the electric motor;
   motor controller means operative to receive said required torque signal and provide a current demand signal based at least partially on said required torque signal;
   current controller means operatively connected to said motor controller means, said current controller means including means for determining multi-phase voltage output command values based at least partially on said current demand signal and means for determining a star voltage of the electric motor, said current controller means being operative to determine multi-phase voltage output command values as a function of said star voltage and said multi-phase voltage command values; and
   means for supplying multi-phase voltage to the electric motor in accordance with said multi-phase voltage output command values to energize the electric motor.

24. The apparatus recited in claim 23, wherein said multi-phase voltage supplied to the electric motor comprises sinusoidal line-to-line voltages.

25. The apparatus recited in claim 23, wherein said multi-phase voltage output command values comprise the sum of said star voltage and said multi-phase voltage command values.

26. The apparatus recited in claim 23, wherein said current controller means comprises:
   means for determining motor dq voltage demand values, said dq voltage demand values comprising a d-axis voltage demand value and a q-axis voltage demand value;
   means for limiting said dq voltage demand values to limited dq voltage demand values, said limited dq voltage demand values being limited to the highest dq voltage available at every advance angle for every electrical angle of the electric motor; and
   means for converting the limited dq voltage demand values to said multi-phase voltage demand values.

27. The apparatus recited in claim 26, wherein said means for converting said limited dq voltage demand values comprises means for using a T'-matrix to convert said limited dq voltage demand values to said multi-phase voltage command values.

28. The apparatus recited in claim 26, wherein said means for determining motor dq voltage demand values comprises means for using a proportional and integral control law to determine said dq voltage demand values.

29. The apparatus recited in claim 28, wherein said means for using a proportional an integral control law comprises:
   means for applying said proportional and integral control law to a d-axis current error value to determine said d-axis voltage demand value;
   means for determining said d-axis current error value as the difference between a
   calculated d-axis current command and a measured d-axis current; means for applying said proportional and integral control law to a q-axis current error value to determine said q-axis voltage demand value; and
   means for determining said q-axis current error value as the difference between a calculated q-axis current command and a measured q-axis current.

30. The apparatus recited in claim 29, further comprising means for determining said calculated d-axis current command and said calculated q-axis current command as a function of a motor current command value and a motor advance angle value.

31. The apparatus recited in claim 30, further comprising means for determining said motor current command value at least partially as a function of a sensed torque value and means for determining said motor advance angle at least partially as a function of a determined rotational speed of the electric motor.

32. The apparatus recited in claim 26, wherein said means for limiting said dq voltage demand values comprises means for computing a vector magnitude of each of said dq voltage demand values and means for limiting said vector magnitudes to said limited dq voltage demand values.

33. The apparatus recited in claim 26, further comprising means for limiting said limited dq voltage demand values to full system voltage multiplied by 1/(sqrt 3).

34. The apparatus recited in claim 26, further comprising means for determining said star voltage of the electric motor as the difference between one of said multi-phase voltage command values and one-half of a full system voltage, said one of said multi-phase voltage command values having an absolute value greater than one-half of the full system voltage.

35. The apparatus recited in claim 26, wherein said star voltage of electric motor is determined by the following formula:

$$V_{star} = -k * V_a * V_b * V_c,$$

where $V_a$, $V_b$, $V_c$ are phase voltages, and k is a modulation constant.

36. The apparatus as recited in claim 35, wherein said modulation constant is equal to 2 and said predetermined phase voltage output is between +0.5 and −0.5.

37. The apparatus as recited in claim 35, wherein said modulation constant is equal to 0.5 and said predetermined phase voltage output is between +1 and −1.

38. The apparatus as recited in claim 35, wherein said phase voltages are limited to a predetermined voltage (X) and said modulation constant is determined by the following formula:

$$k=0.5/X^2.$$

39. The apparatus recited in claim 26, further comprising means for biasing said multi-phase phase voltage output command values to one-half of a full system voltage.

40. The apparatus recited in claim 26, further means for limiting said multi-phase voltage output command values to between zero voltage and full system voltage.

41. The apparatus recited in claim 26, wherein said electric motor comprises an electric assist motor of an electric assist steering system, said means for determining motor dq voltage demand values comprising means for determining motor dq voltage demand values in response to an applied steering torque.

42. The apparatus recited in claim 23, wherein said electric motor comprises a permanent magnet three-phase electric motor, said means for determining multi-phase voltage command values comprising means for determining three-phase voltage command values, said means for determining multi-phase voltage output command values comprising means for determining three-phase voltage output command values, and said means for supplying multi-phase voltage to said electric motor comprising means for supplying three-phase voltage to said electric motor.

43. An electric assist steering system comprising:
an electric assist motor operatively connected to a steering member, said electric assist motor, when energized, providing steering assist;
torque sensing means operatively connected to a vehicle steering wheel, said torque sensing means providing a sensed torque signal indicative of an applied steering torque;
motor controller means operatively connected to said torque sensing means, said motor controller means being operative to provide a current demand signal based at least partially on said sensed torque signal;
current controller means operatively connected to said motor controller means, said current controller means including means for determining multi-phase voltage command values based at least partially on said current demand signal and means for determining a star voltage of the electric motor, said current controller means being operative to determine multi-phase voltage output command values as a function of said star voltage and said multi-phase voltage command values; and
means for supplying multi-phase voltage to the electric assist motor in accordance with said multi-phase voltage output command values to energize the electric assist motor.

44. A method for controlling an electric motor, said method comprising the steps of:
determining multi-phase voltage command values;
determining a star voltage of said electric motor;
determining multi-phase voltage output command values as a function of said star voltage and said multi-phase voltage command values; and
supplying multi-phase voltage to said electric motor in accordance with said multi-phase voltage output command values to energize said electric motor;
wherein said star voltage of said electric motor is proportional to said multiphase command values as follows:

$$V_{star}=-k*V_{Acmd}*V_{Bcmd}*V_{Ccmd},$$

where $V_{acmd}$, $V_{Bcmd}$, and $V_{Ccmd}$ are said multiphase voltage commands, and k is a modulation constant.

45. A method for controlling an electric motor, said method comprising the steps of:
determining multi-phase voltage command values;
determining a star voltage of said electric motor;
determining multi-phase voltage output command values as a function of said star voltage and said multi-phase voltage command values; and
supplying multi-phase voltage to said electric motor in accordance with said multi-phase voltage output command values to energize said electric motor;
wherein said star voltage of said electric motor is determined as the difference between one of said multi-phase voltage command values and one-half of a full system voltage, said one of said multi-phase voltage command values having an absolute value greater than one-half of the full system voltage.

* * * * *